Patented June 8, 1937

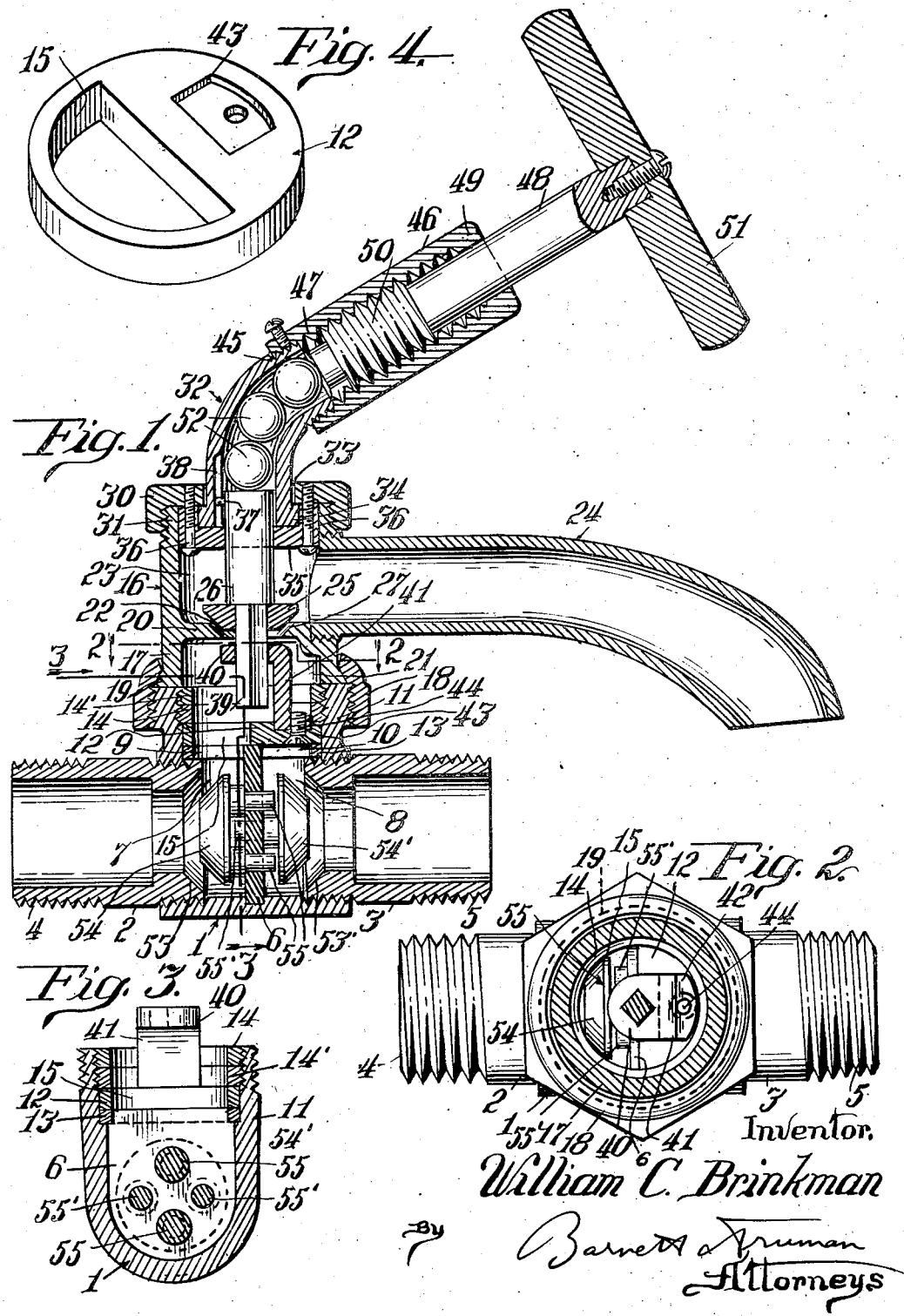
June 8, 1937. W. C. BRINKMAN 2,083,360
MIXING VALVE
Filed July 31, 1936 2 Sheets-Sheet 1
Inventor.
William C. Brinkman
By Barrett & Truman
Attorneys

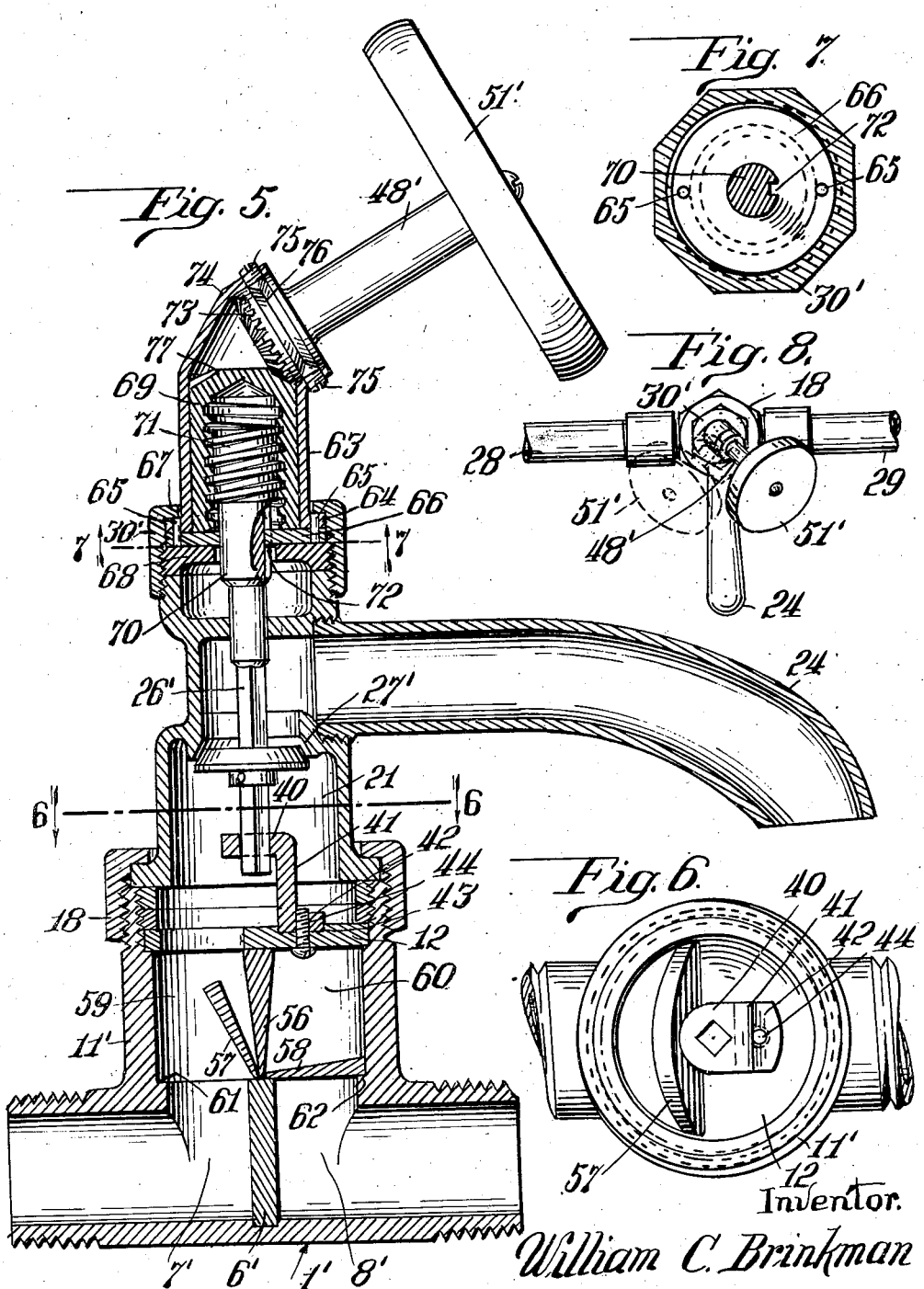

2,083,360

UNITED STATES PATENT OFFICE 2,083,360

MIXING VALVE

William C. Brinkman, Chicago, Ill.

Application July 31, 1936, Serial No. 93,647

17 Claims. (Cl. 277—18)

This invention relates to certain new and useful improvements in a mixing valve adapted to select desired proportions of hot and cold liquids from different sources so as to obtain a liquid of any desired temperature, and then discharge this liquid as desired through a single nozzle. The valve will ordinarily be used for supplying water at a desired temperature, but it will be apparent as the description proceeds that it might be used for handling other liquids.

Briefly described, the device comprises a suitable valve casing containing separator chambers into which cold water and highly heated water from different sources of supply are separately delivered, and a mixing chamber. The first mentioned chambers have separate inlets into the mixing chamber, and a single rotary mixing valve determines the relative proportions of the two liquids that are simultaneously admitted into the mixing chamber. The mixing chamber is separated from the discharge nozzle by a cut-off valve, by means of which the outflow of the mixed liquid at desired temperature is controlled. A single operating handle, capable of two distinct operating movements, is provided for adjusting both of the valves. This handle is mounted on an angularly extending arm, and the handle is rotated about its own axis to open or close the cut-off valve, and the handle may be swung bodily, that is revolved about the axis of the arm, to adjust the position of the mixing valve. In other words, the handle is rotated to turn on the flow of water through the discharge nozzle and then the arm is swung bodily to some selected position to determine the temperature of the water that is supplied. The handle may then be rotated in the opposite direction to turn off the water without necessarily changing the position of the arm.

The principal object of this invention is to provide an improved mixing valve assembly of the type briefly described hereinabove and disclosed more in detail in the specifications which follow.

Another object is to provide an improved mixing-valve adjusting means comprising an operating handle capable of two distinct movements for effectively controlling the mixing and cut-off valves.

Another object is to provide an improved mixing valve adjusting means comprising a handle rotatable about one axis to control the cut-off valve and bodily revoluble about another axis to control the mixing valve.

Another object is to provide an improved rotary plate mixing valve and means for adjusting the same.

Another object is to provide an improved mixing valve having an adjustable nozzle.

Another object is to provide an improved mixing valve including means for preventing back flow through either of the supply pipes.

Other objects and advantages of this invention will be more apparent from the following detailed description of certain approved forms of apparatus constructed and operated according to the principles of this invention.

In the accompanying drawings:

Fig. 1 is a central vertical section through one approved form of valve.

Fig. 2 is a horizontal section, taken substantially on the line 2—2 of Fig. 1.

Fig. 3 is a vertical section taken substantially on the line 3—3 of Fig. 1.

Fig. 4 is a perspective view of the mixing-valve plate.

Fig. 5 is a view similar to Fig. 1 showing another form of valve assembly.

Fig. 6 is a horizontal section taken substantially on the line 6—6 of Fig. 5, but omitting the upper valve casing and coupling ring so as to more clearly disclose the internal valve mechanism.

Fig. 7 is a detail horizontal section taken substantially on the line 7—7 of Fig. 5 and looking upwardly, as indicated by the arrows.

Fig. 8 is a diagrammatic plan view on a smaller scale, illustrating different operative positions of the valve adjusting means.

Referring first to the form of the invention shown in Figs. 1 to 4 inclusive, the valve casing comprises a lower casing member 1, into the opposite sides of which are fitted the similar inlet nipple members 2 and 3, respectively. The outer end portions of these nipple members are threaded at 4 and 5 or otherwise adapted for being joined to the separate supply pipes for the hot and cold water, respectively. The casing member 1 is divided by a central vertical partition or web 6 into a hot water chamber 7 and a cold water chamber 8, which chambers communicate at 9 and 10, respectively, at the two sides of partition 6 with the interior of the upwardly projecting cylindrical extension 11 of the casing member. A mixing valve in the form of a circular flat plate 12 (see also Fig. 4) is rotatably fitted within the upward extension 11 between a fixed collar or ring 13 and an upper ring 14 and locking ring 14' screwed into the upper end portion of extension 11. This valve plate fits closely upon the top of partition 6 and is provided with a substantially semi-circular opening or passage 15. As the valve plate 12 is rotated about its central vertical axis, the passage 15 can be made to communicate selectively with either the hot water passage 9 or the cold water passage 10, or partially with both of these passages as may be desired.

The upper valve casing member 16 is formed with a cylindrical downward extension 17 adapted to fit upon the portion 11 of the lower valve casing and form substantially a continuation thereof. The cylindrical members 11 and 17 are adjustably secured together by the ring coupling 18 threaded on member 11 and having an upper inwardly projecting collar which fits over the outwardly projecting collar portion 19 formed on member 17. An inwardly extending horizontal web 20 within casing member 16 forms the top of a mixing chamber 21, which is partially closed at the bottom by the rotatable valve plate 12. The central outlet passage 22 in web 20 communicates with the discharge chamber 23 from which extends the discharge nozzle 24. The cut-off valve 25 mounted on the vertically reciprocable valve stem 26 is adapted to engage the valve seat 27 formed about outlet passage 22 so as to cut off the flow of water from mixing chamber 21 into discharge chamber 23 and thence out through nozzle 24. In the present form of the invention, the valve 25 will be lifted to open position by the pressure of the water within the valve chambers, but is closed downwardly against this pressure to cut off the flow of water by the hand-operated means hereinafter described.

It will be apparent that since the upper casing member is rotatably adjustable upon the extension 11 of the lower casing member, the nozzle 24 may be adjusted to any desirable rotary position about the vertical axis of the valve stem. Ordinarily the nozzle 24 will extend at substantial right angles to the line of the hot and cold water supply pipes 28 and 29, respectively, (as shown in Fig. 8) but for convenience of illustration, the nozzle has been shown as turned into substantially the same vertical plane as these supply pipes in Figs. 1 and 5.

The upper casing member 16 is closed at the top by the cap member 30 screwed on the upper cylindrical extension 31 of the casing. The rotatable operating head 32 has its lower hollow cylindrical portion projecting downwardly through an opening 33 in cap 30 and is provided with an outwardly extending collar portion 34 rotatably held between the cap member and a sealing ring 35 suspended from the cap member by screws or other suitable means 36.

The upper end portion of valve stem 26 projects up through sealing ring 35 into the lower portion of the rotatable head 32 and is non-rotatably connected with the head by any suitable keying means, such as the pin 37, slidably projecting into the vertical slot 38 in the interior of the head. The lower squared or otherwise non-circular portion 39 of the valve stem projects slidably through a similar shaped opening in the upper horizontally projecting portion 40 of an angular bracket 41 which has its lower angular portion 42 secured to the top of the rotatable valve plate 12. Bracket extension 42 may fit into a recess 43 in the upper surface of the valve plate and be secured thereto by screw 44 or any other suitable connecting means. It will now be seen that a rotation of head 32 about the central vertical axis of the assembly will cause a similar rotation of valve stem 26, which through bracket 41 will also cause the mixing valve 12 to rotate about the same central vertical axis. At the same time, valve stem 26 and cut-off valve 25 may be shifted vertically so as to open or close the discharge port 22.

The head 32 has a laterally or angularly projecting extension 45 to which is secured the tubular member 46 internally threaded at 47. A rotatable operating shaft 48 projects through a bearing 49 in the upper and outer end portions of member 46 and is formed at its inner end with a nut 50 engaging with threads 47 in the laterally projecting arm 46. A handle 51, which may be in the form of a wheel, knob or cross-bar, is secured to the outer end of rotary shaft 48. It will now be apparent that as the shaft 48 is rotated about its own central axis, the nut 50 will be moved in or out through the tubular arm 46. A series of balls 52, slidable through the hollow passage in head 32 are interposed between the inner end of shaft 48 and the upper end of valve stem 26, so that an inward movement of shaft 48 will, through this series of balls, cause the valve stem 26 to be pushed downwardly and thus close the cut-off valve 25. It will be understood that any other suitable form of flexible shaft connection may be used to transmit longitudinal movement from shaft 48 to valve stem 26.

It will now be apparent that if a person grasps the operating handle 51, two different valve-operating movements may be imparted to the assembly. First, by rotating the handle about the axis of shaft 48 in a clockwise direction, the cut-off valve 25 can be forced against its seat so as to shut off the flow of water through nozzle 24, and hold the valve in this closed position, or if the valve is closed, a rotation of the handle in a counter-clockwise direction will withdraw the nut 50 so as to permit the water pressure to open the cut-off valve and continue the flow of water through the nozzle. Second, by swinging the handle 51 and arm 46 bodily about the central vertical axis of the valve stem 26, the mixing valve 12 will be simultaneously rotated about the axis so as to proportion the relative amounts of hot and cold water that are admitted to mixing chamber 21 and then discharged through port 22 and nozzle 24. If the handle and arm are swung to one side position, as indicated in solid lines in Fig. 8, hotter water is provided, and if the handle is swung to the dotted line position, colder water is supplied through the discharge nozzle. In any position of this operating assembly, the cut-off valve 25 may be opened or closed, by rotating handle 51, so as to shut off or turn on the flow of water as desired.

It will be noted that a pair of similar valve seats 53 and 53' are provided at the inner ends of the inlet nipples 2 and 3, respectively, these valve seats being opposed to one another at opposite sides of the central partition 6. A pair of similar valve members 54 and 54' are positioned to cooperate respectively with the valve seats 53 and 53', each valve member having two or more guide pins 55 which slide through guide openings in the partition 6. When the service pressure is on in both inlet pipes the valve members 54 will be moved to the inner open positions shown in Fig. 1, with the enlarged heads 55' of the pins engaging the respective sides of the partition 6. If the pressure in either supply pipe is greatly lowered (for example when the pipe is disconnected) the higher pressure in the other pipe acting on the exposed ends of the pins 55, which project through the partition 6 into the higher pressure chamber, will close that valve member against its seat at the outlet of the low pressure chamber. The attempted back flow of water from the mixing chamber will act on the rear face of this valve to hold it closed, and will also assist in the closing operation. Any small difference in pressures in the supply pipes will not close either valve since the lower pressure acting on the large area of the front valve head will overcome the higher pressure exerted on the relatively small area of the pins 55, and thus the valve will remain in normal open position.

Reference will now be made to Figs. 5, 6 and 7 which show a modified form of valve assembly. The lower valve casing member 1' is divided as before by a central partition 6', but the upward cylindrical extension 11' is of greater height than the extension 11 in the first described form and this extension is divided by a central partition member 56 which forms substantially a vertical extension of the lower partition 6'. At the two sides of the central partition 56 are hingedly mounted a pair of flap valves 57 and 58 which will normally be forced upwardly (as shown by valve 57) to permit the upward flow of water from chambers 7' and 8' into the passages 59 and 60, respectively, at the two sides of the upper partition 56. However, in the event of an attempted back flow of water from the mixing chamber 21, one or the other of these valves will be forced down against its respective seat 61 or 62 (as shown by valve 58) so as to prevent the back flow of water through the supply pipes.

The mixing valve 12 is mounted in the upper end portion of extension 11' above the partition 56 and may be formed and operated substantially as in the first described form of the invention.

In this form of the invention the cut-off valve 25' is mounted as before on the valve stem 26' but is adapted to close upwardly against its valve seat 27', that is, it closes with the outflow of water instead of against it. A different form of means is shown for raising and lowering the valve stem 26' and thus closing and opening the cut-off valve. The hollow cylindrical rotatable head 63 is provided at its lower end with an outstanding flange 64 secured by pins 65 to a lower closure plate 66. The flange 64 and plate 66 are rotatably journaled between the inwardly extending flange 67 at the upper end of closure cap 30' and a sealing ring 68 mounted within the cap. An internally threaded nut 69 is mounted for rotation within the head 63. The enlarged upper end portion 70 of valve stem 26' is slidable through openings in sealing ring 68 and closure plate 66 and is formed at its upper end with a nut 71 engaging the internal threads of nut 69. The closure plate 66 is keyed to portion 70 of the valve stem, as indicated at 72, so that the valve stem is forced to rotate with head 63 but is vertically movable therethrough. The laterally extending operating shaft 48', carrying the operating handle 51' at its outer end, is provided with a bevel gear 73 at its inner end, this gear being journaled in the laterally extending portion or arm 74 of head 63 in any suitable manner. As here shown, pins 75 mounted in arm 74 project into the annular groove 76 formed in the periphery of gear member 73. Gear 73 meshes with and drives a similar bevel gear 77 formed on the upper end of the internally threaded nut 69. Rotation of the operating handle 51' will cause rotation of nut 69, thus drawing up or pushing down the inner nut 71, which is prevented from rotation relative to head 63 by the key connection 72. In this manner cut-off valve 25' may be moved toward or from its seat 27' by rotation of handle 51', and the cut-off valve will be positively held in any selected position. If the handle 51' is revolved bodily about the vertical axis of the valve stem, the valve stem 26' will be caused to rotate with it through the keyed connection 72 so as to adjust the position of the mixing valve 12. It will be understood that the connections between valve stem 26' and the mixing valve may be the same as in the first described form of the invention.

It will be understood that the form of valve for preventing back flow, shown in Fig. 1, could be substituted for the form shown in Fig. 5 or vice versa, and also that the form of means for raising and lowering the cut-off valve, as shown in Fig. 1, could be substituted for the form shown in Fig. 5, or vice versa.

It will be noted that in both of these forms of valve assembly, or in any suitable modification thereof, as covered by the claims which follow, both the cut-off and mixing valves are operated by a single control handle and the assembly is quite compact and of pleasing appearance. The cut-off valve can be manipulated and held in either open or closed position in any adjustment of the mixing valve, that is, when the correct temperature of water has been obtained, the mixing valve may be left in this position and the supply of water through nozzle 24 may be shut off or turned on, as desired, without disturbing the adjustment of the mixing valve.

I claim:

1. In combination, a valve casing including a hot water chamber, a cold water chamber and a mixing chamber, inlet pipe connections to the hot and cold water chambers respectively, a discharge nozzle extending from the casing, a rotary mixing valve between the hot and cold water chambers and the mixing chamber, a reciprocable cut-off valve between the mixing chamber and discharge nozzle, a head rotatably mounted on the casing, an operating arm rotatable with the head and extending laterally therefrom at a fixed angle to the axis of rotation of the head, operating connections for causing swinging movement of the arm about the axis of rotation of the head to rotate the mixing valve, and means comprising a handle mounted for rotation about the longitudinal axis of the arm for reciprocating the cut-off valve.

2. In combination, a valve casing including a hot water chamber, a cold water chamber and a mixing chamber, inlet pipe connections to the hot and cold water chambers respectively, a discharge nozzle extending from the casing, a rotary mixing valve between the hot and cold water chambers and the mixing chamber, a reciprocable cut-off valve between the mixing chamber and discharge nozzle, a head rotatably mounted on the casing, an operating arm rotatable with the head and extending laterally therefrom, operating connections for causing swinging movement of the arm about the axis of rotation of the head to rotate the mixing valve, a handle mounted for rotation on the arm, and operating connections in the arm and head for causing rotary movement of the handle to produce reciprocable movement of the cut-off valve.

3. In combination, a valve casing including a hot water chamber, a cold water chamber and a mixing chamber, inlet pipe connections to the hot and cold water chambers respectively, a discharge nozzle extending from the casing, a rotary mixing valve between the hot and cold water chambers and the mixing chamber, a reciprocable cut-off valve between the mixing chamber and discharge nozzle, a head rotatably mounted on the casing, a valve-operating stem having one end portion projecting into the head and shiftable longitudinally along the axis of rotation of the head, means for keying the stem to the head to rotate therewith, the cut-off valve being mounted on the stem to be reciprocated thereby between open and closed positions, a member on the mixing valve slidably but non-rotatably connected with the stem whereby rotary movement of the stem will rotate the mixing valve, an operating arm rotatable with the head and extending laterally therefrom, so that swinging movement of the arm about the axis of rotation of the head will rotate the mixing valve, a handle mounted for rotation on the arm, and operating connections in the arm and head for causing rotary movement of the handle to reciprocate the valve-stem.

4. In combination, a valve casing including a hot water chamber, a cold water chamber and a mixing chamber, inlet pipe connections to the hot and cold water chambers respectively, a discharge nozzle extending from the casing, a rotary non-reciprocable mixing valve between the hot and cold water chambers and the mixing chamber, a reciprocable cut-off valve between the mixing chamber and discharge nozzle, a head rotatably mounted on the casing, a valve-operating stem having one end portion projecting into the head and shiftable longitudinally along the axis of rotation of the head, means for keying the stem to the head to rotate therewith, the cut-off valve being mounted on the stem to be reciprocated thereby between open and closed positions, a member on the mixing valve slidably but non-rotatably connected with the stem whereby rotary movement of the stem in any of its longitudinal positions will rotate the mixing valve, an operating arm rotatable with the head and extending laterally therefrom so that swinging movement of the arm about the axis of rotation of the head will rotate the mixing valve, and means comprising a handle mounted for rotation on the arm for reciprocating the valve-stem.

5. In combination, a valve casing including a hot water chamber, a cold water chamber and a mixing chamber, inlet pipe connections to the hot and cold water chambers respectively, a discharge nozzle extending from the casing, a rotary non-reciprocable mixing valve between the hot and cold water chambers and the mixing chamber, a reciprocable cut-off valve between the mixing chamber and discharge nozzle, a head rotatably mounted on the casing, a valve-operating stem having one end portion projecting into the head and shiftable longitudinally along the axis of rotation of the head, means for keying the stem to the head to rotate therewith, the cut-off valve being mounted on the stem to be reciprocated thereby between open and closed positions, a member on the mixing valve slidably but non-rotatably connected with the stem whereby rotary movement of the stem in any of its longitudinal positions will rotate the mixing valve, an operating arm rotatable with the head and extending laterally therefrom so that swinging movement of the arm about the axis of rotation of the head will rotate the mixing valve, and means comprising a handle movable on the arm for reciprocating the valve stem.

6. In combination, a valve casing including a hot water chamber, a cold water chamber and a mixing chamber, inlet pipe connections to the hot and cold water chambers respectively, a discharge nozzle extending from the casing, a rotary non-reciprocable mixing valve between the hot and cold water chambers and the mixing chamber, a reciprocable cut-off valve between the mixing chamber and discharge nozzle, a head rotatably mounted on the casing, a valve-operating stem having one end portion projecting into the head and shiftable longitudinally along the axis of rotation of the head, means for keying the stem to the head to rotate therewith, the cut-off valve being mounted on the stem to be reciprocated thereby between open and closed positions, a member on the mixing valve slidably but non-rotatably connected with the stem whereby rotary movement of the stem in any of its longitudinal positions will rotate the mixing valve, and means associated with the head for selectively rotating the head and reciprocating the stem to move either or both valves and hold the valves in the selected positions.

7. In combination, a valve casing including a hot water chamber, a cold water chamber and a mixing chamber, inlet pipe connections to the hot and cold water chambers respectively, a discharge nozzle extending from the casing, a rotary mixing valve between the hot and cold water chambers and the mixing chamber, a reciprocable cut-off valve between the mixing chamber and the discharge nozzle, a head rotatably mounted on the casing, a valve-operating stem having one end portion projecting into the head and shiftable longitudinally along the axis of rotation of the head, means for keying the stem to the head to rotate therewith, the cut-off valve being mounted on the stem to be reciprocated thereby between open and closed positions, a member on the mixing valve slidably but non-rotatably connected with the stem whereby rotary movement of the stem will rotate the mixing valve, an operating arm rotatable with the head and extending laterally therefrom so that swinging movement of the arm about the axis of rotation of the head will rotate the mixing valve, a shaft rotatably mounted in the arm and projecting in line with the arm from the outer end thereof and having an operating handle at its outer end, a nut on the inner end of the shaft, a portion of the arm being internally threaded to engage the nut whereby rotation of the shaft will cause longitudinal movement thereof, and a flexible shaft connection mounted within the arm and head and connecting the inner end of the shaft with the outer end of the valve stem.

8. In combination, a valve casing including a hot water chamber, a cold water chamber and a mixing chamber, inlet pipe connections to the hot and cold water chambers respectively, a discharge nozzle extending from the casing, a rotary mixing valve between the hot and cold water chambers and the mixing chamber, a reciprocable cut-off valve between the mixing chamber and the discharge nozzle, a head rotatably mounted on the casing, a valve-operating stem having one end portion projecting into the head and shiftable longitudinally along the axis of rotation of the head, means for keying the stem to the head to rotate therewith, the cut-off valve being mounted on the stem to be reciprocated thereby between open and closed positions, a member on the mixing valve slidably but non-rotatably connected with the stem whereby rotary movement of the stem will rotate the mixing valve, an operating arm rotatable with the head and extending laterally therefrom so that swinging movement of the arm about the axis of rotation of the head will rotate the mixing valve, a shaft rotatably mounted in the arm and projecting in line with the arm from the outer end thereof and having an operating handle at its outer end, a nut on the inner end of the shaft, a portion of the arm being internally threaded to engage the nut whereby rotation of the shaft will cause longitudinal movement thereof, and a plurality of balls positioned in longitudinal series within the arm and head and interposed between the inner end of the shaft and the outer end of the valve-stem.

9. In combination, a valve casing including a hot water chamber, a cold water chamber and a mixing chamber, inlet pipe connections to the hot and cold water chambers respectively, a discharge nozzle extending from the casing, a rotary mixing valve between the hot and cold water chambers and the mixing chamber, a reciprocable cut-off valve between the mixing chamber and the discharge nozzle, a head rotatably mounted on the casing, a valve-operating stem having one end portion projecting into the head and shiftable longitudinally along the axis of rotation of the head, means for keying the stem to the head to rotate therewith, the cut-off valve being mounted on the stem to be reciprocated thereby between open and closed positions, a member on the mixing valve slidably but non-rotatably connected with the stem whereby rotary movement of the stem will rotate the mixing valve, an operating arm rotatable with the head and extending laterally therefrom so that swinging movement of the arm about the axis of rotation of the head will rotate the mixing valve, a shaft rotatably mounted in the arm and projecting in line with the arm from the outer end thereof and having an operating handle housed within its outer end, and connections housed within the arm and head for translating rotary movement of the shaft into longitudinal movement of the valve-stem.

10. In combination, a valve casing including a hot water chamber, a cold water chamber and a mixing chamber, inlet pipe connections to the hot and cold water chambers respectively, a discharge nozzle extending from the casing, a rotary mixing valve between the hot and cold water chambers and the mixing chamber, a reciprocable cut-off valve between the mixing chamber and the discharge nozzle, a head rotatably mounted on the casing, a valve-operating stem having one end portion projecting into the head and shiftable longitudinally along the axis of rotation of the head, means for keying the stem to the head to rotate therewith, the cut-off valve being mounted on the stem to be reciprocated thereby between open and closed positions, a member on the mixing valve slidably but non-rotatably connected with the stem whereby rotary movement of the stem will rotate the mixing valve, an operating arm rotatable with the head and extending laterally therefrom so that swinging movement of the arm about the axis of rotation of the head will rotate the mixing valve, a shaft rotatably mounted in the arm and projecting in line with the arm from the outer end thereof and having an operating handle at its outer end, an internally threaded nut mounted for rotation within the head, gear connections between the inner end of the shaft and the outer end of the nut, and an externally threaded nut engaged within the internal nut and mounted on the outer end of the valve-stem so that rotation of the internally threaded nut will move the valve-stem longitudinally.

11. In combination, a valve-casing including a hot water chamber, a cold water chamber and a mixing chamber, inlet pipe connections to the hot and cold water chambers respectively, a discharge nozzle extending from the casing, a cut-off valve between the mixing chamber and the discharge nozzle, passages extending from the respective hot and cold water chambers and having separate outlets communicating with the mixing chamber, a mixing valve movable to selectively open or close these outlets to any desired extent to determine the respective volumes of flow from the hot and cold water chambers into the mixing chamber, means for selectively operating the cut-off and mixing valves, and one-way valves positioned in each of the passages and opening only toward the mixing chamber.

12. In combination, a valve-casing including a hot water chamber, a cold water chamber and a mixing chamber, inlet pipe connections to the hot and cold water chambers respectively, a discharge nozzle extending from the casing, a cut-off valve between the mixing chamber and the discharge nozzle, passages extending from the respective hot and cold water chambers and having separate outlets communicating with the mixing chamber, a mixing valve movable to selectively open or close these outlets to any desired extent to determine the respective volumes of flow from the hot and cold water chambers into the mixing chamber, means for selectively operating the cut-off and mixing valves, and flap valves pivotally mounted in each of the passages and automatically opening to permit flow toward the mixing chamber, these valves closing automatically to prevent return flow from the mixing chamber into either of the other chambers.

13. In combination, a valve-casing including a hot water chamber, a cold water chamber and a mixing chamber, inlet pipe connections to the hot and cold water chambers respectively, a discharge nozzle extending from the casing, a cut-off valve between the mixing chamber and the discharge nozzle, passages extending from the respective hot and cold water chambers and having separate outlets communicating with the mixing chamber, a mixing valve movable to selectively open or close these outlets to any desired extent to determine the respective volumes of flow from the hot and cold water chambers into the mixing chamber, means for selectively operating the cut-off and mixing valves, and valve means adapted to prevent back flow from the casing through either of the inlet pipe connections.

14. In combination, a valve-casing including a hot water chamber, a cold water chamber and a mixing chamber, inlet pipe connections to the hot and cold water chambers respectively, a discharge nozzle extending from the casing, a cut-off valve between the mixing chamber and the discharge nozzle, a web in the casing separating the hot and cold water chambers, there being outlet openings from these chambers at the respective sides of the web and communicating with the mixing chamber, a mixing valve movable to selectively open and close these outlets to any desired extent to determine the respective volumes of flow from the hot and cold water chambers into the mixing chamber, means for selectively operating the cut-off and mixing valves, there being valve seats at the outlets of the inlet pipe connections, these valve seats being opposed to one another at opposite sides of the web, and a pair of similar movable valve members each having a valve head positioned in one inlet chamber and adapted to engage the adjacent valve seat and a smaller portion projecting through the web into the other inlet chamber, said members being shiftable by the difference in pressures existing in the respective hot and cold water chambers.

15. In combination, a valve-casing including a hot water chamber, a cold water chamber and a mixing chamber, inlet pipe connections to the hot and cold water chambers respectively, a discharge nozzle extending from the casing, a cut-off valve between the mixing chamber and the discharge nozzle, a web in the casing separating the hot and cold water chambers, there being outlet openings from these chambers at the respective sides of the web and communicating with the mixing chamber, a mixing valve movable to selectively open and close these outlets to any desired extent to determine the respective volumes of flow from the hot and cold water chambers into the mixing chamber, means for selectively operating the cut-off and mixing valves, cut-off valves positioned respectively in the hot and cold water chambers at the outlets of the inlet pipe connections, and members movable through the web and operable by a difference in pressures existing between the hot and cold water chambers for alternatively closing the cut-off valve communicating with the chamber under the lower pressure.

16. In combination, a valve casing enclosing a hot water chamber, a cold water chamber and a mixing chamber, the casing comprising a relatively fixed lower casing section in which the hot and cold water chambers are located, and an upper casing section adjustable about a central vertical axis, a discharge nozzle extending from the upper casing section, a rotary mixing valve positioned in the lower casing section between the hot and cold water chambers and the mixing chamber and rotatably adjustable about the vertical axis, a cut-off valve in the upper casing section between the mixing chamber and the discharge nozzle and vertically reciprocable along the vertical axis, a head rotatably mounted on the upper casing section about the vertical axis, a laterally extending operating arm mounted to swing with the head about the central vertical axis, operating connections to cause this swinging movement of the arm to rotate the mixing valve, and means comprising a handle movable on the arm for reciprocating the cut-off valve, the nozzle and upper casing section being rotatably adjustable about the vertical axis without disturbing the effective positioning of either valve.

17. In combination, a valve casing enclosing a hot water chamber, a cold water chamber and a mixing chamber, the casing comprising a relatively fixed lower casing section in which the hot and cold water chambers are located, and an upper casing section adjustable about a central vertical axis, a discharge nozzle extending from the upper casing section, a rotary mixing valve positioned in the lower casing section between the hot and cold water chambers and the mixing chamber and rotatably adjustable about the vertical axis, a cut-off valve in the upper casing section between the mixing chamber and the discharge nozzle and vertically reciprocable along the vertical axis, a head rotatably mounted on the upper casing section about the vertical axis, and means carried by the head for independently and separately adjusting the position of each of the valves, the nozzle and upper casing section being rotatably adjustable about the vertical axis without disturbing the effective positioning of either valve.

WILLIAM C. BRINKMAN.